US005170179A

United States Patent [19]

Chen et al.

[11] Patent Number: 5,170,179

[45] Date of Patent: Dec. 8, 1992

[54] THERMAL PRINTHEAD WITH IMPROVED RESOLUTION AND INTER-DOT ISOLATION

[75] Inventors: Kang Chen, Somerset; Nhut Chau, Jackson, both of N.J.

[73] Assignee: Gulton Industries, Inc., Greenwich, R.I.

[21] Appl. No.: 649,696

[22] Filed: Feb. 1, 1991

[51] Int. Cl.[5] .................... B41J 2/335; G01D 15/10; G01D 15/16

[52] U.S. Cl. .................... 346/76 PH; 219/543

[58] Field of Search .................... 346/76 PH; 219/543

[56] References Cited

U.S. PATENT DOCUMENTS

| | | | |
|---|---|---|---|
| 4,034,187 | 7/1977 | Tomioka et al. | 346/76 PH |
| 4,203,119 | 5/1980 | Naguib et al. | 346/76 PH |
| 4,559,542 | 12/1985 | Mita | 346/76 PH |
| 4,586,054 | 4/1986 | Kurita | 346/76 PH |
| 4,623,903 | 11/1986 | Hashimoto | 346/76 PH |

*Primary Examiner*—Benjamin R. Fuller
*Assistant Examiner*—Huan Tran
*Attorney, Agent, or Firm*—Darby & Darby

[57] ABSTRACT

Pulse fingers are disposed on a heat-generating material which fingers are pulsed to change the resistance of portions of the heat-generating material. By such change in the resistance of the heat-generating material, electrical current diffusion is prevented and heat diffusion is permitted between the changed resistance portion of the heat-generating material, thereby providing high resolution character printing and so-called "continuous" graphics printing.

10 Claims, 6 Drawing Sheets

THERMAL PRINTHEAD WITH IMPROVED RESOLUTION AND INTER-DOT ISOLATION

BACKGROUND OF THE INVENTION

The present invention relates to a thermal printing head which is adapted to improve printing resolution and to prevent light printing of areas which are not addressed.

In conventional thermal printing devices, a thermal printhead is provided in which a plurality of dots, i.e., heating resistor elements, are formed in a horizontal row of a dot row resistor material. In such a thermal head, current is supplied to each dot to generate heat, thereby darkening or coloring heat-sensitive paper for thermal printing. A diode matrix is used to address each particular dot in a group of consecutive dots and to prevent current from flowing to dots which have not been selected to print. The group of consecutive dots is chosen to correspond to the width of a column which is printed on the heat-sensitive paper.

In such a conventional printhead, current from activated dots in a particular group may leak to an adjacent group of consecutive dots thereby causing a light printing of adjacent dots which have not been addressed. If light printing of unselected dots occurs, the alphanumeric character or graphics will have a degraded resolution.

FIG. 1 illustrates a conventional solution to the problem of light printing by physically isolating adjacent groups. FIG. 1 (not drawn to scale) illustrates a partial schematic view of a portion of a conventional thermal printhead. In the figure, a row of dot resistor material 16 is divided by conductive inner fingers 100–112 into individual dot resistors. The dot resistors are arranged in a predetermined group 500 of consecutive dots. Lead wires 300–313 are provided to supply electricity to the individual dot resistors. A second group 501 is partially illustrated having conductive fingers 200–208 and lead wires 400–408 which correspond to fingers 100–108 and lead wires 300–308, respectively, of group 500. It is known in the art that the number of groups may be varied to coincide with the width of the paper.

In the conventional printhead, the inner fingers 100–112 and 200–208 and lead wire portions 300–313 and 400–408 are constructed of an electrically conductive material, such as gold. The fingers and lead wires may be formed on a glazed alumina ceramic substrate 15, or the like, by metallization and wet etching techniques, or screen printing techniques, as are known in the art. The dot row resistor material 16 may be formed of $R_uO_2$-based thick film resistive ink such as DUPONT 1700 series and may be mixed in a glass frit and then screened across the inner fingers 100–112 and 200–208, these techniques all being well-known to those having ordinary skill in this art. A protective glass layer (not shown) can be screened and then fixed (e.g., by firing) over the thermal printhead or the dot resistor portion thereof. A flexible cable 51 connects the thermal printhead to a printhead controller (not shown). A housing 53 is connected with screws 52 to the substrate 15 for protection of the thermal printhead. Further, arrow 1000 represents the direction of movement of the thermal paper (not shown). An example of a conventional printhead as just described is the GULTON 01160 diode-matrix printhead.

In the conventional printhead, a group is physically separated from an adjacent group by cutting the dot resistor material 16 with a diamond saw or the like. The physical separation between groups can be defined as an inter-group gap 119. As a result, leakage current is unable to flow across the inter-group gap 119 from one group 500 to another 501. However, with a thermal head of this kind, the cutting of the row of dot resistor material 16 results in a space formed in the pattern printed on the thermal paper which is proportional to the size of the inter-group gap. Thus, the conventional thermal head is not suitable for continuous bar code or graphics printing.

Other examples of conventional printheads are: U.S. Pat. Nos. 4,623,903 to Hashimoto; 4,203,119 to Naguib et al.; 4,559,542 to Mita; and 4,034,187 to Tomioka et al. The complete disclosure of each of these patents is incorporated herein by reference.

SUMMARY OF THE INVENTION

This invention is directed to a thermal printing head applicable to bar code and graphics printing, as well as character printing, in which the problems inherent in the prior art devices are eliminated. It is, therefore, a general object of the present invention to provide a thermal printing head which can provide continuous bar code and graphics printing across the width of the printhead.

Another object of the present invention is to provide a thermal printing head of simple construction for improving resolution which eliminates printing of unaddressed regions of the resistor material.

In accordance with this invention, a thermal printhead is provided with a dot row resistor heat generating material. A plurality of fingers are arranged on the heat generating material and are independently connected to a power source for independent energization, thereby heating corresponding portions of the heat generating material. The portions of the heat generating material are arranged in groups corresponding to the width of a printed column. A plurality of pulse fingers are arranged between the groups in the heat generating material and are pulsed to change resistance of the portion of the heat generating material proximate to the pulsed finger. The heat-generating material between the groups, referred to as a "pseudo" inter-group gap, can be energized when end dots of adjacent groups are energized. Accordingly, groups can be electrically isolated and the "pseudo" inter-group gap can be energized, thereby providing both high resolution character printing and continuous graphic printing.

Other objects and advantageous features of this invention will be apparent from the following description of the preferred embodiment with reference to the accompanying drawings.

DESCRIPTION OF THE PREFERRED EMBODIMENT

Figure 2:
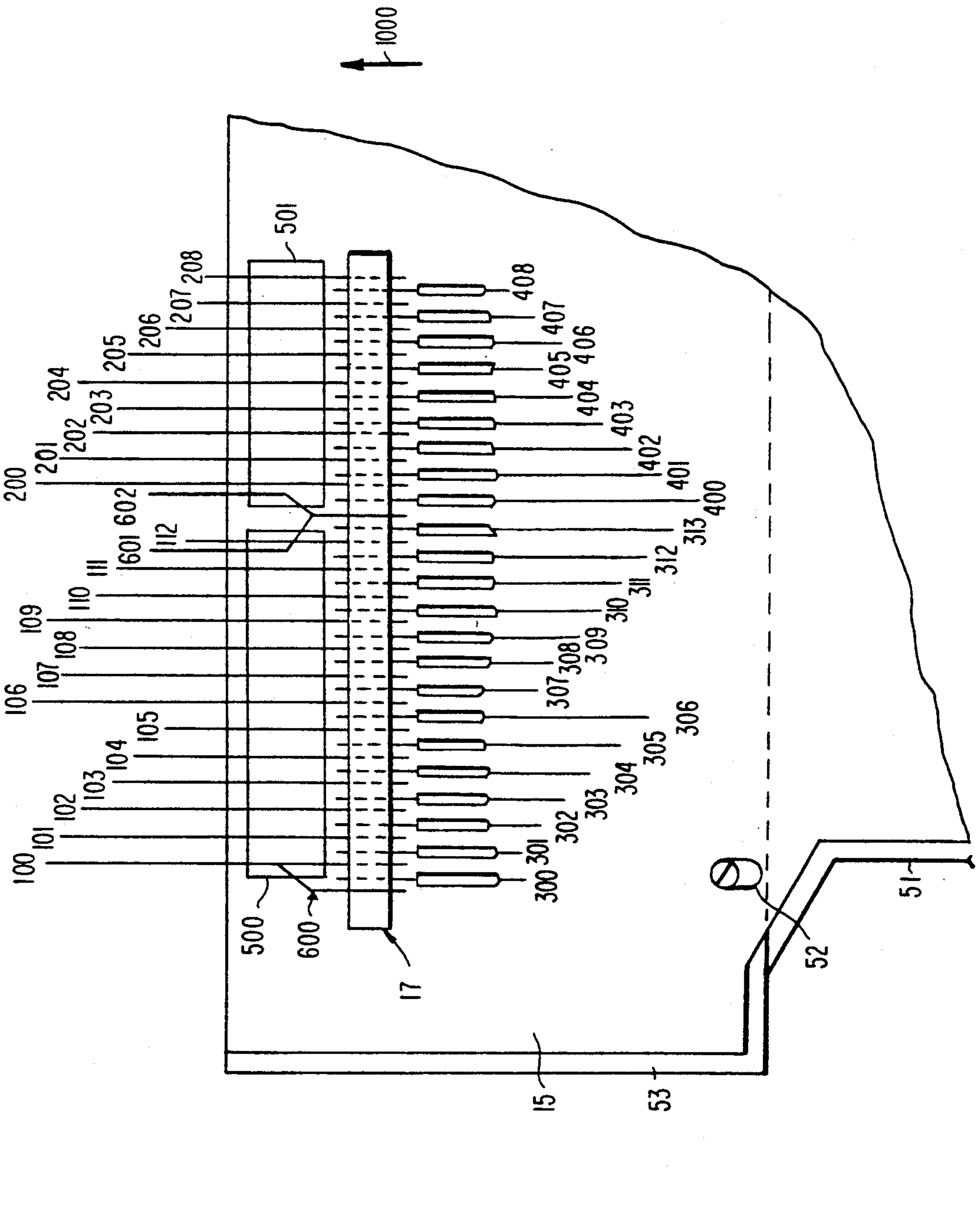
FIG. 2 is a schematic view of a thermal printhead according to the present invention.

FIG. 2 diagrammatically illustrates an embodiment of the basic concept of this invention wherein the same structures as the prior art ones are designated by the same reference numerals. FIG. 2 illustrates a partial schematic view of a portion of a thermal printhead according to the present invention. It will be understood by those skilled in the art that FIG. 2 is not drawn to scale.

In FIG. 2, across a row of dot resistor material 17 is arranged a plurality of electrically conductive fingers 100–112 and lead wires 300–313 to divide the row of dot resistor material 17 into individual dot resistors to form a predetermined group 500 of consecutive dots. Each dot resistor is provided with a lead wire 300–313 to supply electricity to the individual dot row resistor. A second group 501 is partially illustrated having conductive fingers 200–208 and lead wires 400–408 which correspond to fingers 100–108 and lead wires 300–308 of group 500, respectively.

In a preferred embodiment, an electrically conductive pulse finger 600–602 is positioned in the vicinity of each end of each group 500–501 of dots. For example, pulse finger 601 is positioned at an end of the group 500 and pulse finger 602 is positioned at an end of group 501 which end is adjacent to group 500. Moreover, pulse fingers 601 and 602 form a pair of pulse fingers positioned in the "pseudo" inter-group gap between adjacent groups 500 and 501. In another variation, a single pulse finger can be positioned within the "pseudo" inter-group gap.

The pulse fingers 600–602 may preferably be formed to have a width smaller, i.e., on the order of 0.5 to 1.0 mils, than the width of the inner fingers 100–112 and 200–208. The inner fingers 100–112 and 200–208 may conventionally have a width of, e.g., about 2.0 mils. Further, preferably the pair of pulse fingers (e.g., 600 and 601) can be positioned closer to one another, i.e., at a distance in the range of 0.7 to 1.2 mils to form a smaller space between the pairs of pulse fingers than the usual space between adjacent inner fingers within a given dot group, i.e., about 6.5 mils. Other variations in spacing of the fingers are possible depending upon the particular arrangement and materials used.

Figure 1:
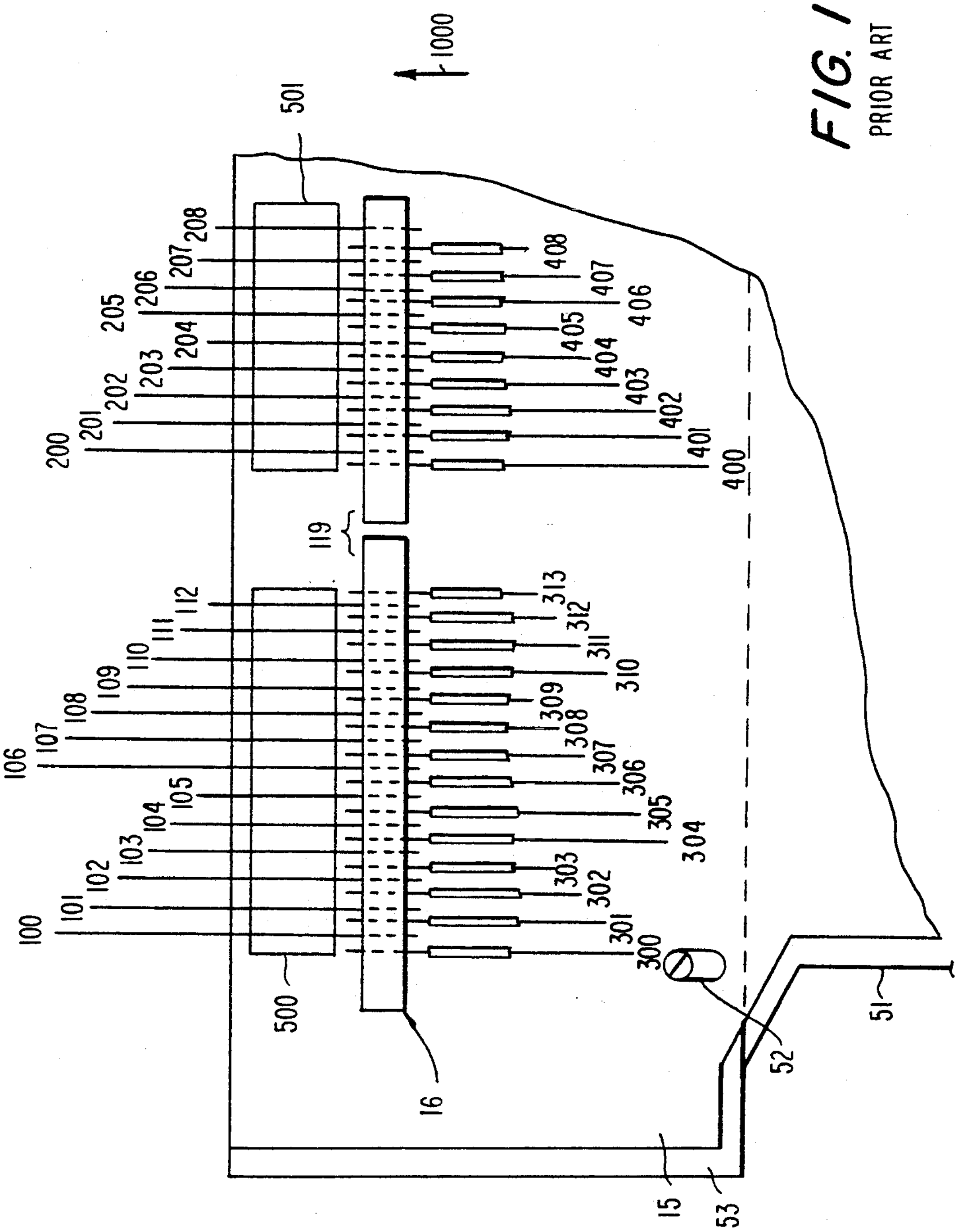
FIG. 1 PRIOR ART
FIG. 1 is a schematic view of a conventional thermal printing head.
Figure 3:
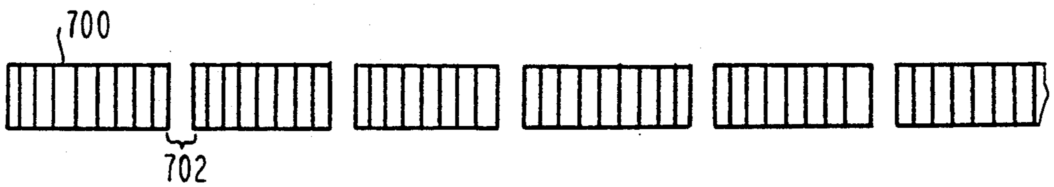
FIG. 3 is an illustration of a sample printout from a conventional thermal printhead.

According to the head of the conventional type as shown in FIG. 1 as already described above, the inter-group gap 19 is formed as an air space between adjacent groups by a physical cutting of the dot row resistor material 16. The cutting with a diamond saw typically results in an air gap of about 2.0 mils in the dot row resistor material 16. As shown in FIG. 3, illustrating a printout from the conventional printhead of FIG. 1, the physical inter-group gap 119 in the dot row resistor material 16 produces the printing of gaps 702 when printing a horizontal bar 700.

In contrast to this arrangement, in the preferred embodiment of the present invention, pairs of pulse fingers 601, 602 are placed at the location where the inter-group gap would conventionally be cut. According to a preferable design of the present invention, the width of the "pseudo" inter-group gap can be adjusted by moving the fingers closer together and, in turn, the "pseudo" gap is smaller than the conventional gap in the dot row resistor material which is physically cut.

Referring to FIG. 2, with this preferred arrangement the isolation of one group from another is accomplished by voltage pulsing the dot row resistor material 17 of the "pseudo" inter-group gap between two groups. This is the material disposed between a pair of pulse fingers, i.e., 601 and 602. The voltage pulsing of one of the pulse fingers, i.e., 601 in the pair of pulse fingers raises the value of the dot row resistor material 17 between the pair of pulse fingers. Thus, the increase in the value of the resistor material forms a high resistance material. Further, when the applied voltage pulse is greater, the resistance material obtains a higher resistance value. For example, a pulse in the range of 50V for 400 milliseconds raises the value of the resistance material by a value of about 10,000. Further still, the smaller the distance between the pair of pulse fingers, the larger will be the resistive increase in the high resistance material. It will be appreciated that other variations, such as using a different resistance material for portions of the printhead as are known in the art, may be used for forming the high resistance material between groups.

A change in the resistance value can be controlled either by changing the width between the pulse fingers or the pulse value which is applied to the pulse fingers, or both. If the fingers are close together, i.e., at a distance of 0.7 mil, the resistance material can produce high resistance by receiving pulses at the normal printhead operating voltage, approximately 22 volts for 2 milliseconds, without receiving an additional pulse from the pulse generator.

The formed high resistance material produces an electrical barrier between groups adjacent to the high resistance material. The electrical barrier prevents current from leaking or flowing between the two groups and prevents printing of dots that are not being addressed. Further, with this arrangement, when dots adjacent to the "pseudo" inter-group gap are energized, such as in graphics or bar code printing, the high resistance material is a conductor of heat produced by the activated dots.

Figure 4:
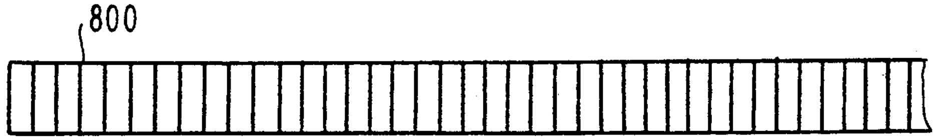
FIG. 4 is an illustration of a sample printout from a thermal printhead according to the present invention.
Figure 5:
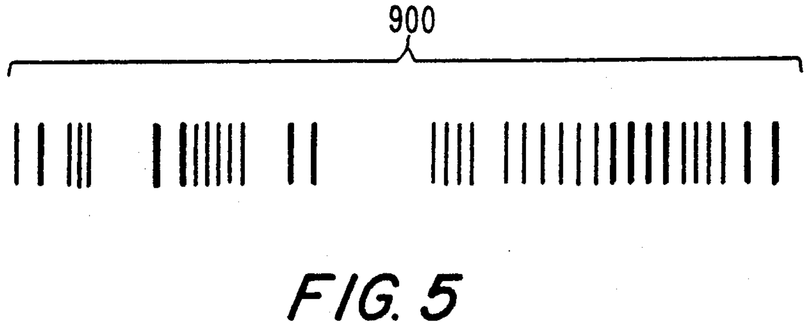
FIG. 5 is an illustration of a sample printout from a thermal printhead according to the present invention.

As illustrated in FIG. 4 and FIG. 5, a dot is printed in the "pseudo" inter-group gap to produce a printout with a "continuous" graphics bar 800 or bar code pattern 900. Moreover, the continuous bar code is a bar code in which a bar can be printed at any position along the width of the page and a continuous horizontal bar graph is a horizontal bar without gaps.

Figure 6:
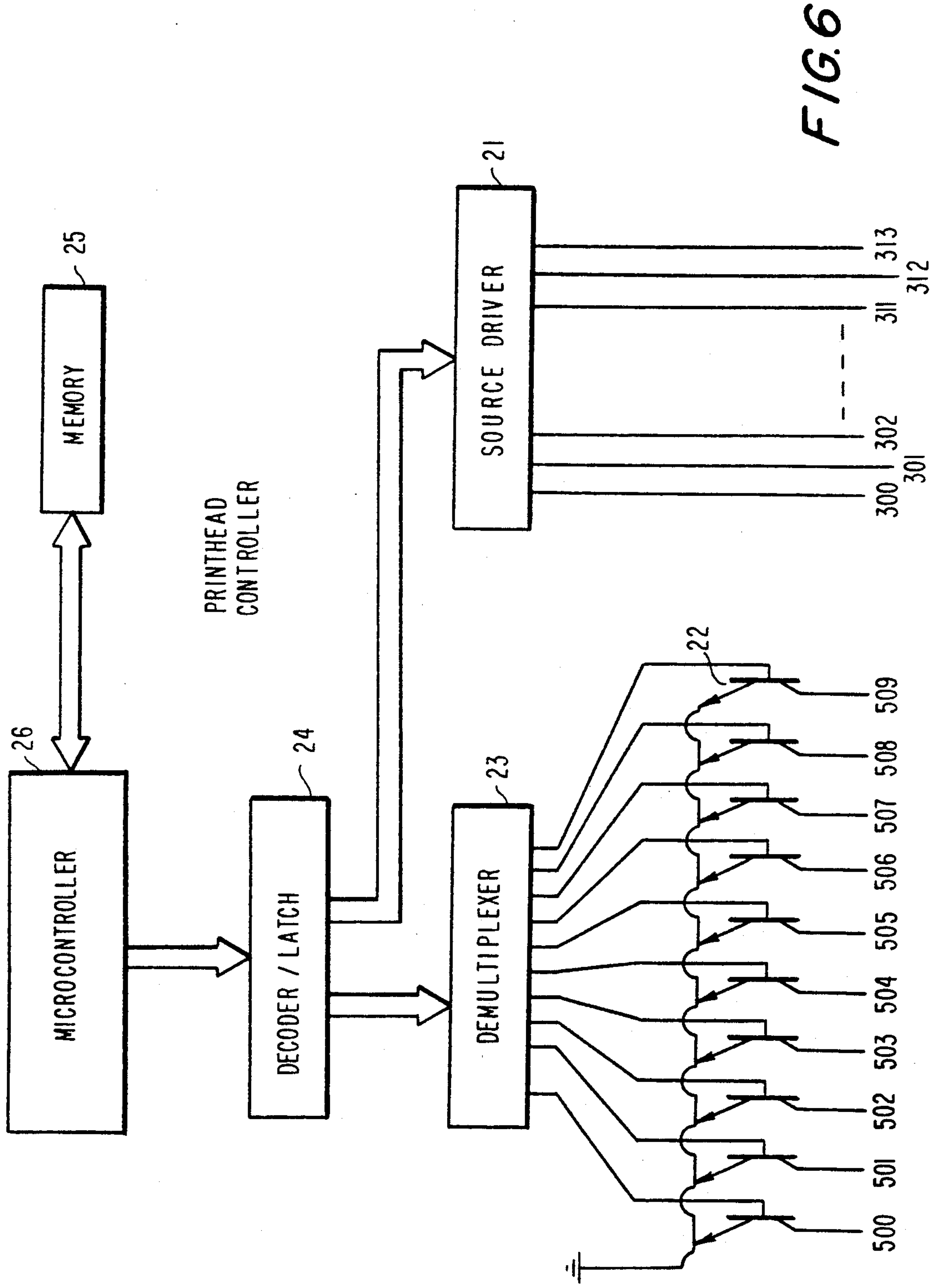
FIG. 6 is a schematic diagram of the thermal printhead controller according to the present invention.

FIG. 6 illustrates the printhead controller 20 which is connected to lines 300–313 and groups 500–509. The printhead controller 20 is essentially conventional and is used to selectively activate a particular dot associated group 500–509 and an associated line 300–313. A presently preferred printhead controller 20 includes an EPROM memory 25 (2732 INTEL), microcontroller 26 (INTEL 8031), decoder/latch 24 (TI 7402 and TI 74373), demultiplexer 23 (TI 74259), source driver 21 (SPRAGUE UDN 2981) and transistors (NATIONAL SEMICONDUCTOR 2N6037). A reverse bias diode (not shown) (SPRAGUE IN 3600) is associated with each 300–313 line to allow current to flow in only one direction thereby associating each dot with a particular line. The appropriate interconnection of these components is well-known to be a routine engineering exercise and is not germane to the present invention. Other variations of the printhead controller having the same or equivalent components described above are also known which can control variations of the number of lines and groups.

In operation of the printhead controller, a particular dot is energized by having the group 500–509 associated with the dot latched in order to receive current from a particular source line. The source current provided to each dot is of from a voltage source ranging on the order of 15–25 volts dc and, preferably, has operating value of 22 volts dc. It will be appreciated that the amount of source current that can be generated can be varied as is known in the art.

Figure 7:
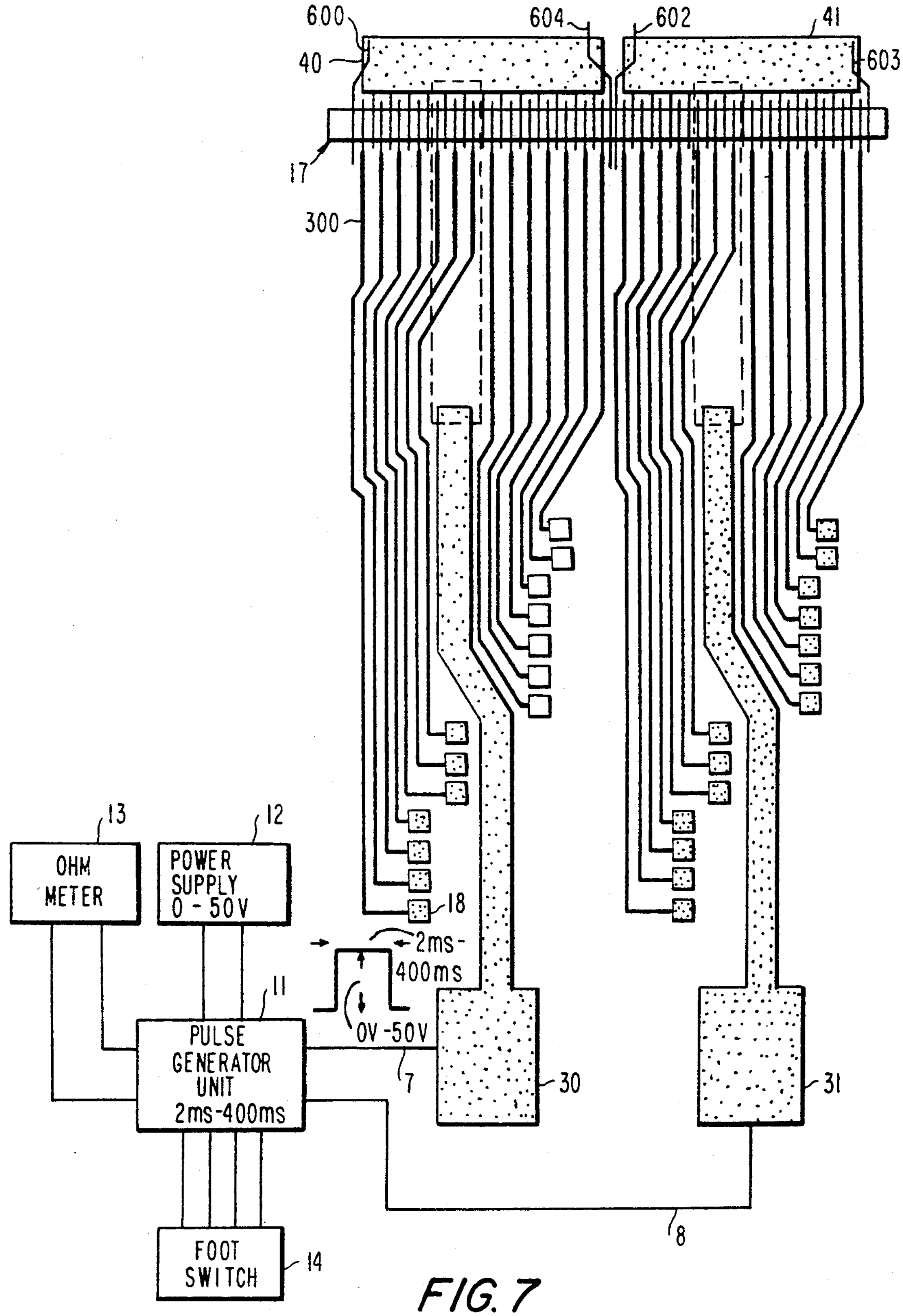
FIG. 7 is a schematic diagram of a thermal printhead with an apparatus for supplying voltage pulsing according to the present invention.

Referring to FIG. 7, a schematic diagram of a preferable device used for pulsing the "pseudo" inter-group gap is illustrated. Connectors 7 and 8 are coupled from a pulse generator unit to a respective conductor pad 30 and 31. The conductor pads 30 and 31 extend to respective conductors 40 and 41 positioned above the dot row resistor 17. A predetermined pulsing width and voltage is provided from power supply 12 and pulse generator unit 11. For example, the voltage supplied is in the range of 0 to 50 volts dc and the pulse width is in the range of 2 to 400 milliseconds. Preferably, the pulse has a voltage of 50 volts dc for a period of 2 milliseconds to produce the high resistance material.

In a preferable arrangement of the pulsing device, the resistance can be measured with an ohm meter 13 before pulsing to allow the desired pulse to be applied to the "pseudo" inter-group gap. When voltage pulsing the "pseudo" inter-group gap of the dot row resistor material 17, a switch 14 selectively connects the pulse generator to a respective conductor pad 30 and 31. A pulse is sent to the inter-group gap through a respective pulse finger 600–602 which, in turn, conducts the pulse to the dot row resistor material 17 located between the pair of pulse fingers 601 and 602. A reverse bias diode 18 (SPRAGUE IN 3600) is associated with each line to allow current to flow in only one direction thereby associating each dot with a particular line.

Figure 8:
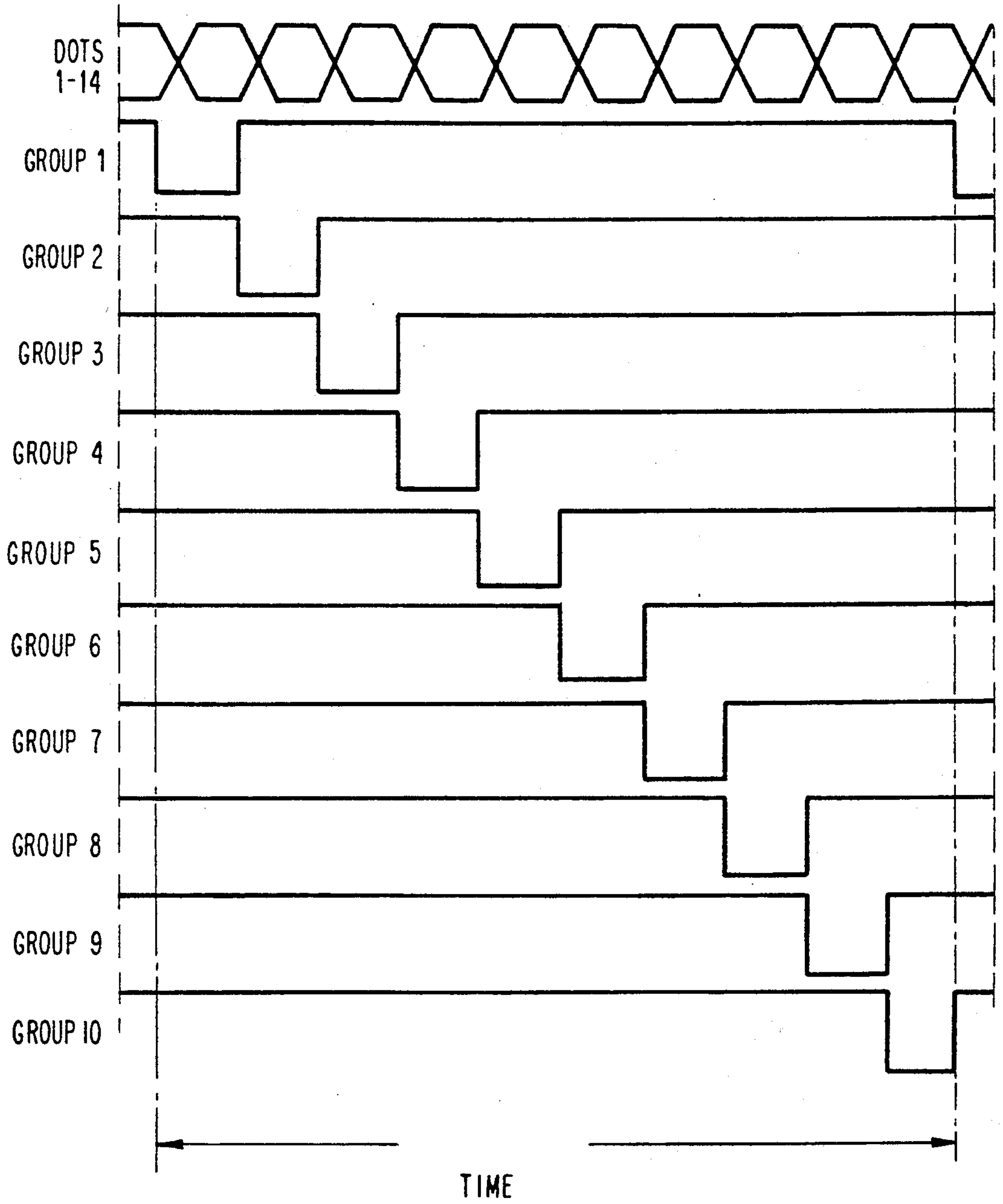
FIG. 8 is a diagram of waveforms according to the thermal printhead of the present invention.

Operation of the circuits shown in FIGS. 2, 6 and 7 is explained by referring to the wave forms of FIG. 8. The wave forms indicate that a dot line is printed by consecutively printing each group. In a preferred embodiment, each group which comprises 14 dots can be printed in about 2 milliseconds. It is apparent that in other variations, the printing time for each group can be varied. It will also be appreciated that the number of groups which correspond to the width of the printed sheet of paper and the number of dots in each group which correspond to the width of a printed column can be varied as desired, as is known in the art.

Although the invention is described with reference to a plurality of embodiments thereof with a preferred one among them, it is to be expressly understood that the invention is in no way limited to the disclosure of such embodiments but is capable of numerous modifications within the scope of the appended claims.

What is claimed is:

1. A thermal printhead comprising:

a plurality of conductive fingers arranged on a heat generating material, the heat generating material having a resistance value;

a plurality of pulse fingers disposed at predetermined locations between the plurality of conductive fingers;

means for pulsing at least one of the plurality of pulse fingers so as to change the resistance value of a portion of the heat generating material positioned proximate to the at least one pulsed pulse finger, thereby electrically isolating the pulse fingers positioned on either side of said portion of the heat generating material; and means for heating a predetermined portion of the heat generating material by providing electricity to a respective one of the plurality of conductive fingers.

2. The thermal printhead of claim 1, wherein the pulsing means comprises a pulse generator for providing a predetermined pulse value and connecting means to connect the pulse generator to the plurality of pulse fingers.

3. The thermal printhead of claim 2, further comprising means for initiating the means for pulsing before the means for heating.

4. The thermal printhead of claim 3, wherein the plurality of pulse fingers are arranged in a plurality of pairs of pulse fingers and are disposed between predetermined groups of the plurality of conductive fingers, wherein in each of said pairs of pulse fingers, one of said pulse fingers is positioned a predetermined distance from the other of said pulse fingers.

5. The thermal printhead of claim 4, wherein the means for pulsing energizes one of the pulse fingers in each pair of pulse fingers.

6. The thermal printhead of claim 5, wherein the predetermined pulse value is determined by the predetermined distance between the pair of pulse fingers.

7. The thermal printhead of claim 6, wherein the change of a portion of heat-generating material provides a high resistance material.

8. The thermal printhead of claim 7, wherein the high resistance material generates heat when respective fingers positioned adjacent to the high resistance material are provided with electricity.

9. A thermal printhead for creating visible indicia on a heat-sensitive material, comprising:

a row of resistive material disposed on a substrate;

a first group of conductive fingers disposed along the row in conductive relationship therewith so as to print a first mark on the material when at least one the conductive fingers is supplied with a voltage;

a second group of conductive fingers disposed along the row in conductive relationship therewith so as to print a second mark on the material when at least one of the conductive fingers is supplied with a voltage, the first and second groups being contiguous; and means for electrically isolating the first group from the second group, said means comprising means for selectively increasing the resistance value of the resistive material at a predetermined portion.

10. The printhead of claim 9, wherein the predetermined portion is located between the first and second groups.

* * * * *